(12) United States Patent
Hariram et al.

(10) Patent No.: US 7,259,384 B2
(45) Date of Patent: Aug. 21, 2007

(54) FLUID LEVEL OPTICAL DETECTOR WITH FLOAT HAVING OPAQUE AND TRANSMISSIVE PORTIONS

(75) Inventors: Sham S. Hariram, Laguna Hills, CA (US); Sharanpal S. Sikand, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/114,332

(22) Filed: Apr. 25, 2005

(65) Prior Publication Data

US 2006/0237670 A1    Oct. 26, 2006

(51) Int. Cl.
*G01F 23/292* (2006.01)
(52) U.S. Cl. .................. 250/577; 250/573; 250/575; 250/900; 250/901; 73/290 R; 73/290 B; 73/293; 73/305; 73/309; 73/314; 73/319
(58) Field of Classification Search ............... 250/221, 250/222.1, 573, 575, 577, 900, 901; 73/290 R, 73/293, 290 B, 305, 309, 314, 319; 340/618, 340/619, 623
See application file for complete search history.

(56) References Cited

U.S. PATENT DOCUMENTS

| | | | | |
|---|---|---|---|---|
| 4,014,010 A | * | 3/1977 | Jinotti | ............... 222/51 |
| 4,119,860 A | * | 10/1978 | Gooley | ............. 250/577 |
| 4,445,238 A | * | 5/1984 | Maxhimer | ............. 4/508 |
| 4,627,283 A | | 12/1986 | Nishida et al. | |
| 5,743,135 A | * | 4/1998 | Sayka et al. | ............. 73/293 |
| 6,333,512 B1 | * | 12/2001 | Wirthlin | ............. 250/577 |
| 6,408,692 B1 | | 6/2002 | Glahn | |
| 6,571,626 B1 | | 6/2003 | Herford | |
| 6,795,598 B1 | * | 9/2004 | Devenyi | ............. 385/12 |

FOREIGN PATENT DOCUMENTS

| | | |
|---|---|---|
| EP | 0058056 A2 | 8/1992 |
| EP | 0846942 A2 | 6/1998 |
| GB | 2002905 A | 2/1979 |
| GB | 2064761 A | 1/1981 |
| JP | 55080019 | 6/1980 |
| JP | 55101818 | 8/1980 |
| JP | 59114415 A * | 7/1984 |
| JP | 59155720 | 9/1984 |

(Continued)

OTHER PUBLICATIONS

GB Combined Search and Examination Report for Application No. GB0607930.5, dated Aug. 31, 2006, 7pages.

*Primary Examiner*—Davienne Monbleau
(74) *Attorney, Agent, or Firm*—Lee & Hayes, PLLC

(57) ABSTRACT

Systems and methods for fluid level detection are disclosed. In one embodiment, a sensor assembly includes at least one optical fiber adapted to at least one of transmit and receive an optical signal, and a moveable float member. The float member is adapted to move in a first direction as the fluid level increases and in a second direction as the fluid level decreases. The float member blocks the optical signal at a first value of the fluid level, and allows the optical signal to pass at a second value of the fluid level. The presence or absence of the optical signal is detected to determine the level of fluid.

10 Claims, 5 Drawing Sheets

FOREIGN PATENT DOCUMENTS

| | | | |
|---|---|---|---|
| JP | 60086422 | | 5/1985 |
| JP | 60086423 A | * | 5/1985 |
| JP | 60259934 | | 12/1985 |
| JP | 61008625 | | 1/1986 |
| JP | 5240683 | | 9/1993 |

* cited by examiner

FLUID LEVEL OPTICAL DETECTOR WITH FLOAT HAVING OPAQUE AND TRANSMISSIVE PORTIONS

FIELD OF THE INVENTION

This invention relates to systems and methods for fluid level detection, and more specifically, to systems and methods for measuring fuel levels within fuel tanks using optical fibers.

BACKGROUND OF THE INVENTION

Many types of vehicles and machines consume fuel during operation, including aircraft, ships, construction vehicles, and a wide variety of other machinery. As vehicles and machines operate, the level of fuel within a fuel tank decreases. As fuel is added, the fuel level increases. A variety of systems and methods are known to provide an indication of the amount of fuel within the fuel tank, including, for example, those systems disclosed in U.S. Pat. No. 6,571,626 B1 issued to Herford, U.S. Pat. No. 6,408,692 B1 issued to Glahn, and U.S. Pat. No. 4,627,283 issued to Nishida et al. Although desirable results have been achieved using such prior art systems, there is room for improvement.

SUMMARY OF THE INVENTION

The present invention is directed to systems and methods for sensing fluid levels using optical fibers, including measuring fuel levels within fuel tanks, and transmitting this data through optical fibers. Embodiments of systems and methods in accordance with the present invention may advantageously allow fluid levels within a tank to be determined without the need to transmit electrical signals into the tank, and may also improve the costs associated with maintenance and repair of fluid level sensors in comparison with the prior art.

In one embodiment, a sensor assembly adapted to sense a fluid level includes at least one optical fiber adapted to at least one of transmit and receive an optical signal, and a moveable float member. The float member is adapted to move in a first direction as the fluid level increases and in a second direction as the fluid level decreases. The float member blocks the optical signal at a first value of the fluid level, and allows the optical signal to pass at a second value of the fluid level. The presence or absence of the optical signal is detected to determine the level of fluid.

BRIEF DESCRIPTION OF THE DRAWINGS

Preferred and alternate embodiments of the present invention are described in detail below with reference to the following drawings.

DETAILED DESCRIPTION

The present invention relates to systems and methods for measuring fuel levels within fuel tanks using fiber optics. Many specific details of certain embodiments of the invention are set forth in the following description and in FIGS. 1–7 to provide a thorough understanding of such embodiments. The present invention may have additional embodiments, or may be practiced without one or more of the details described for any particular described embodiment.

Figure 1:
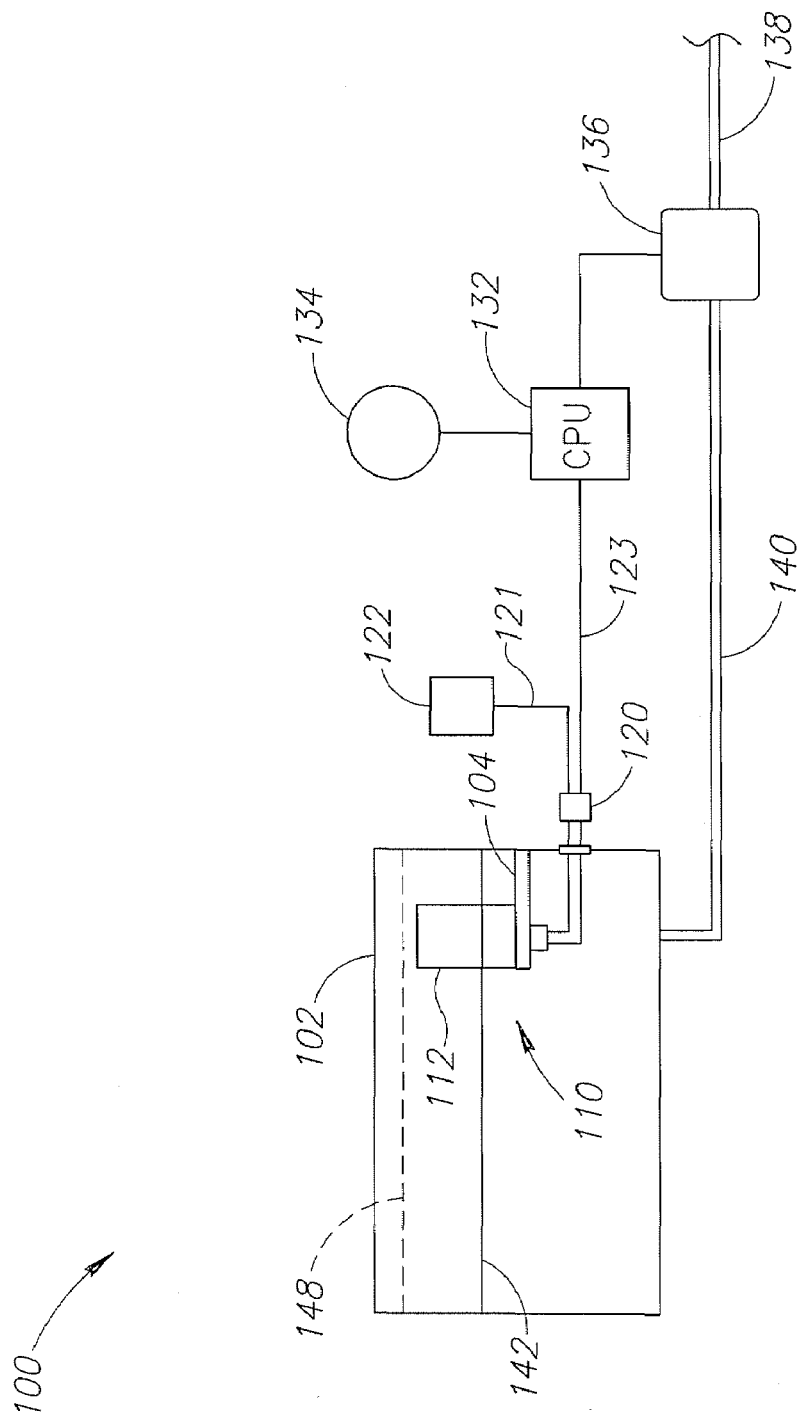
FIG. 1 is a side elevational view of a fuel tank assembly in accordance with an embodiment of the invention.
Figure 2:
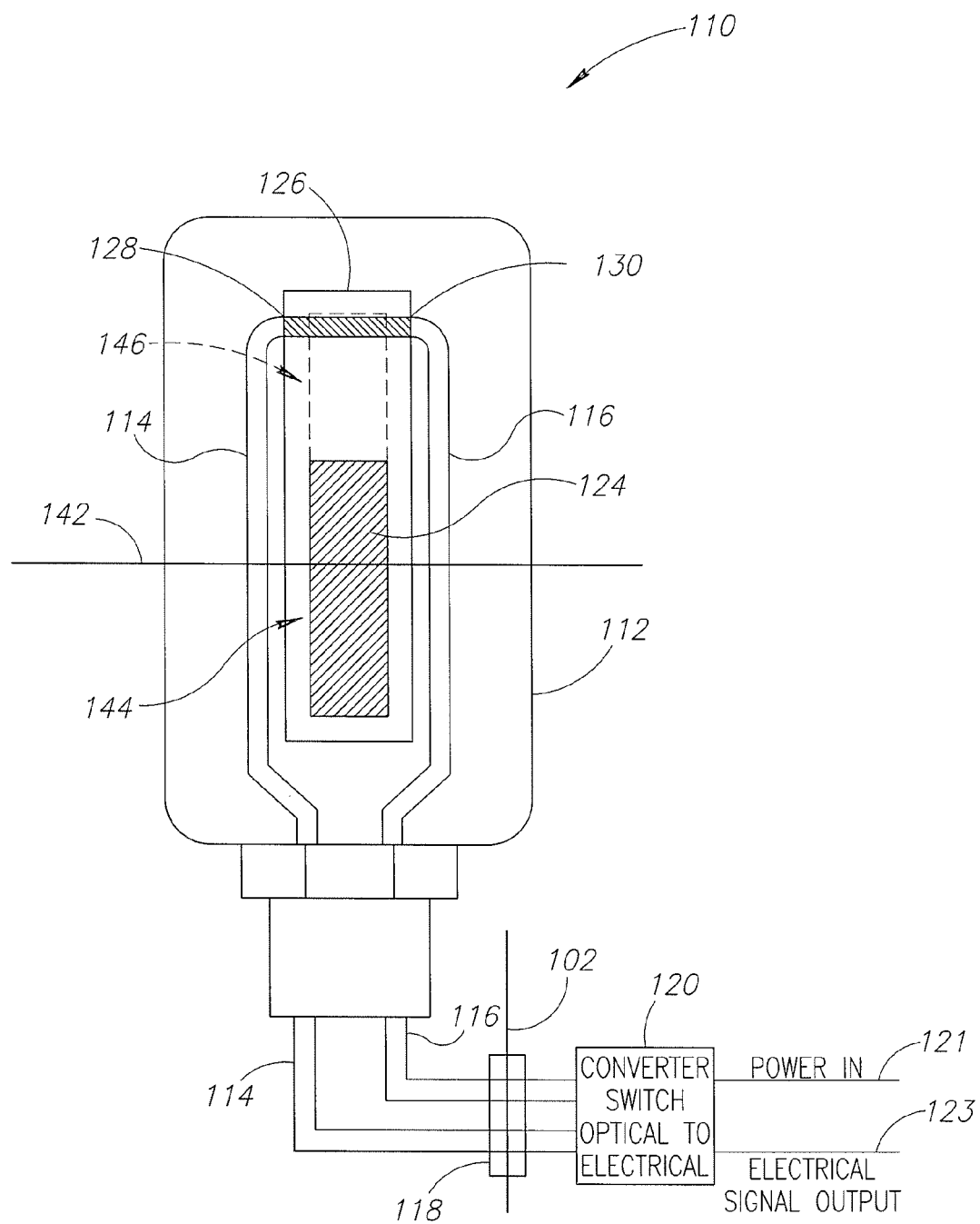
FIG. 2 is an enlarged, side elevational view of a sensor assembly of the fuel tank assembly of FIG. 1 in accordance with an embodiment of the invention.

FIG. 1 is a side elevational view of a fuel tank assembly 100 in accordance with an embodiment of the invention. In this embodiment, the fuel tank assembly 100 includes a tank 102 and a sensor assembly 110 coupled to the tank 102 by a support 104. FIG. 2 is an enlarged, side elevational view of the sensor assembly 110 of FIG. 1. In this embodiment, the sensor assembly 110 includes an optical sensor 112 coupled by first and second optical fibers 114, 116 to a converter switch 120. The converter switch 120 may be a conventional component, including, for example, those converter switches commercially available. The first and second optical fibers 114, 116 pass through a sealing member 118 disposed within the wall of the fuel tank 102. A power source 122 is coupled to the converter switch 120.

As further shown in FIG. 2, the optical sensor 112 includes a float 124 disposed within a guide member 126 adapted to partially limit a range of motion of the float 124. The first optical fiber 114 is coupled to an upper portion of the guide member 126, and the second optical fiber 116 is coupled to the guide member 126 opposite from the first optical fiber 114. An end portion of the first optical fiber 114 thus forms an emitter 128, and an opposing end portion of the second optical fiber 116 forms a receiver 130.

Referring again to FIG. 1, the converter switch 120 may be coupled to a processor (or CPU) 132 which, in turn, may be coupled to a display device 134 (e.g. a gauge, digital readout, display, etc.), and to a pump 136. A first conduit 138 is coupled between a fuel source (not shown) and the pump 136, and a second conduit 140 is coupled between the pump 136 and the tank 102.

In operation, power is provided by the power source 122 along an input lead 121 to the converter switch 120. The converter switch 120 outputs and optical signal along the first optical fiber 114. The optical signal may be composed of visible or non-visible light (ultraviolet or infrared), may be monochromatic or non-monochromatic, and may be continuous or non-continuous. As best shown in FIG. 2, at a first fuel level 142, the float 124 is positioned at a lower position 144 in which the float 124 is not disposed between the emitter 128 and the receiver 130, allowing the optical signal to transmit the between the emitter 128 and the receiver 130. The optical signal then passes along the second optical fiber 116 to the converter switch 120. A corresponding output signal may be transmitted along an output lead 123 to the processor 132. The processor 132 may interpret the output signal and may provide an indication of the fuel level within the fuel tank 102 to the display 134.

The processor 132 may also provide a control signal to the pump 136, including, for example, a first control signal that causes the pump 136 to pump additional fuel from the fuel source (not shown) into the fuel tank 102. As the fuel level within the tank 102 rises and approaches an upper fuel level 148 (FIG. 1), the float 124 is raised to a second position 146 in which it is disposed between the emitter 128 and the receiver 130 thereby blocking the optical signal. As the optical signal is no longer received at the converter switch 120, the output signal may cease to be transmitted along the output lead 123 to the processor 132. In response, the processor may transmit a second control signal that causes the pump 136 to stop pumping.

Figure 3:
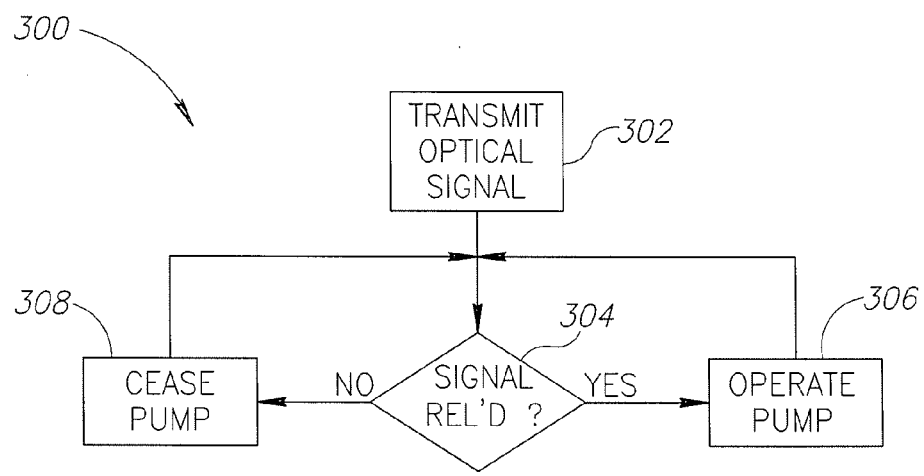
FIG. 3 is a flow diagram of a method of sensing a fuel level in accordance with a further embodiment of the invention.

FIG. 3 is a flow diagram of a method 300 of sensing a fuel level in the tank 102 in accordance with one embodiment of the invention. In this embodiment, the method 300 includes transmitting the optical signal from the converter switch 120 along the first optical fiber 114 at a block 302. At a block 304, a determination is made regarding whether the optical signal is being received at the receiver 130. If the optical signal is being received, then at a block 306, appropriate action is taken to operate the pump 136 to raise the fuel level within the tank 102, and the method 300 returns to the determination block 304. Alternately, if the optical signal is not been received, then appropriate action is taken to stop the pump 136 at block 308, and again, the method 300 returns to the determination block 304. The method 300 may continue indefinitely, or may be terminated at any desired time.

Embodiments of the present invention may provide significant advantages over the prior art. For example, because the sensor assembly 110 utilizes an optical signal rather than an electrical signal, there is no need for an electrical signal to be transmitted within the tank 102, thereby improving the safety of the assembly. Furthermore, the simplicity of the sensor assembly 110 may increase reliability and reduce the costs associated with maintenance and repair.

Figure 4:
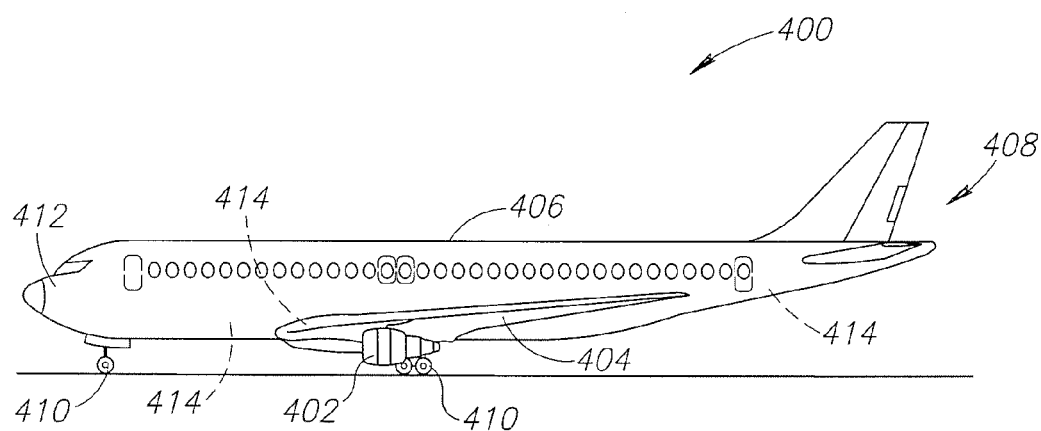
FIG. 4 is a side elevational view of an aircraft in accordance with yet another embodiment of the invention.

Embodiments of the present invention may be used in a wide variety of applications, including aircraft, ships, construction vehicles, and a wide variety of other machinery. For example, FIG. 4 is a side elevational view of an aircraft 400 in accordance with yet another embodiment of the invention. The aircraft 400 generally includes a variety of components and subsystems generally known in the pertinent art, and which, in the interest of brevity, will not be described in detail. For example, the aircraft 400 generally includes one or more propulsion units 402 that are coupled to wing assemblies 404, or alternately, may be coupled to a fuselage 406 or even other portions of the aircraft 400. Additionally, the aircraft 400 includes a tail assembly 408 and a landing assembly 410 coupled to the fuselage 406, and a flight control system 412 (not shown in FIG. 4), as well as a plurality of other electrical and mechanical systems and subsystems that cooperatively perform a variety of tasks necessary for the operation of the aircraft 400. The aircraft 400 also includes one or more fuel tank assemblies 414 (not visible) in accordance with the present invention. The fuel tank assemblies 414 may be disposed within the wing assemblies 404 and within the fuselage 406 of the aircraft 400.

The aircraft 400 shown in FIG. 4 is generally representative of a commercial passenger aircraft, including, for example, the 737, 747, 757, 767 and 777 commercial passenger aircraft available from The Boeing Company of Chicago, Ill. In alternate embodiments, however, embodiments of the invention may be incorporated into flight vehicles of other types. Examples of such flight vehicles include other commercial aircraft, manned or unmanned military aircraft, rotary wing aircraft, or types of flight vehicles, as illustrated more fully in various descriptive volumes, such as Jane's All The World's Aircraft, available from Jane's Information Group, Ltd. of Coulsdon, Surrey, UK.

Figure 5:
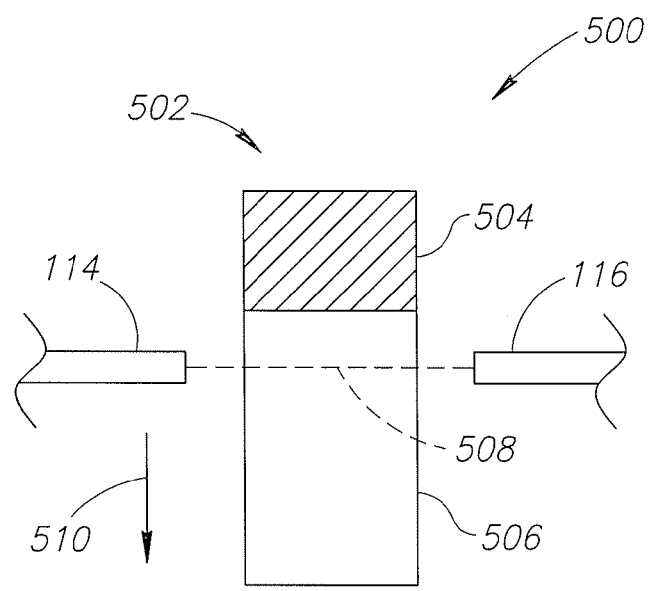
FIG. 5 is a side elevational view of a sensor assembly in accordance with an alternate embodiment of the invention.

It will be appreciated that a variety of alternate embodiments of sensor assemblies in accordance with the present invention may be conceived, and that the invention is not limited to the particular embodiments described above. For example, FIG. 5 is a side elevational view of a sensor assembly 500 in accordance with an alternate embodiment of the invention. In this embodiment, the sensor assembly 500 includes a float 502 having an opaque portion 504 and an optically-transmissive portion 506. In operation, when the fuel level within the fuel tank 102 approaches the upper fuel level 148 (FIG. 1), the optically-transmissive portion 506 of the float 502 is disposed between the first and second optical fibers 114, 116, allowing the optical signal 508 to pass therebetween. As the fuel level within the tank 102 drops, the float 502 moves in a downward direction 510 until the opaque portion 504 of the float 502 is disposed between the first and second optical fibers 114, 116, blocking the optical signal 508. The sensor assembly 500 may be suitably coupled to one or more other components to perform other desired functions, including, for example, to monitor or maintain a desired fuel level within the fuel tank 102. More specifically, with reference to FIG. 1, the sensor assembly 500 may be coupled to the converter switch 120 which may, in turn, transmit an electrical signal to the processor 136 when the fuel level is at or near the upper fuel level 148. As the fuel level decreases and the opaque portion 504 blocks the optical signal 508, the converter switch 120 may cease transmitting the electrical signal to the processor 136, which may in turn transmit a control signal to the pump 136 to cause additional fuel to be supplied to the tank 102.

Figure 6:
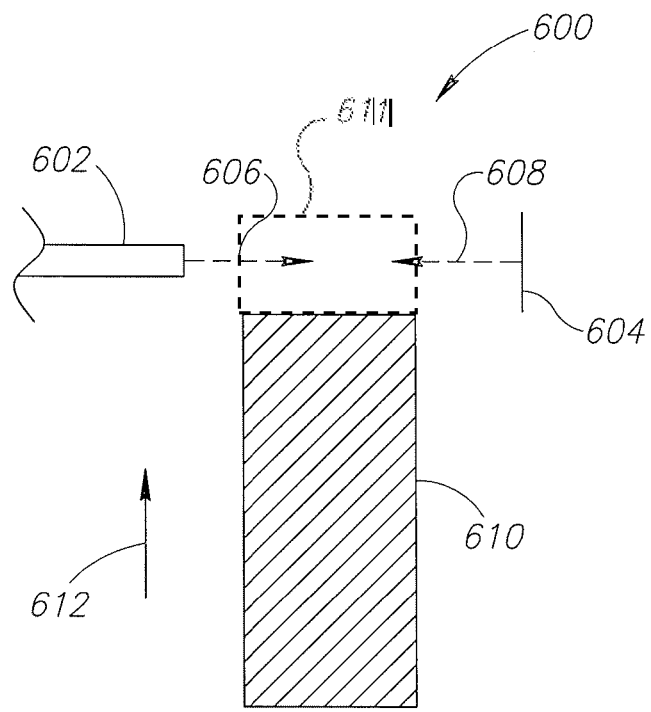
FIG. 6 is a side elevational view of a sensor assembly in accordance with another alternate embodiment of the invention.

FIG. 6 is a side elevational view of a sensor assembly 600 in accordance with another alternate embodiment of the invention. In this embodiment, a single optical fiber 602 is directed toward a reflective surface 604. In operation, an optical signal 606 emitted by the optical fiber 602 is transmitted toward the reflective surface 604, and a reflected signal 608 is transmitted back from the reflective surface 604 to the optical fiber 602. As a fuel level within the fuel tank 102 rises, an opaque float moves in an upward direction 612 until it blocks at least one of the optical signal 606 and the reflected signal 608. In an alternative embodiment, the opaque float 610 may include an optically-transmissive portion 611, as explained above in FIG. 5. The sensor assembly 600 may be suitably coupled to one or more other components to perform other desired functions, including, for example, to monitor or maintain a desired fuel level within the fuel tank 102. More specifically, the sensor assembly 600 may be coupled to the converter switch 120 (FIG. 1). As the reflected signal 608 is received by the single optical fiber 602, it may be transmitted back to the converter switch 120 which may, in turn, transmit an electrical signal to the processor 136, indicating that the fuel level is not at or near the upper fuel level 148. The processor 136 may, in turn, cause the pump 136 to provide additional fuel to the fuel tank 102. As the fuel level increases and the opaque float 610 blocks at least one of the optical signal 606 and the reflected signal 608, the converter switch 120 may cease transmitting the electrical signal to the processor 136, which may in turn cause the pump 136 to cease.

Figure 7:
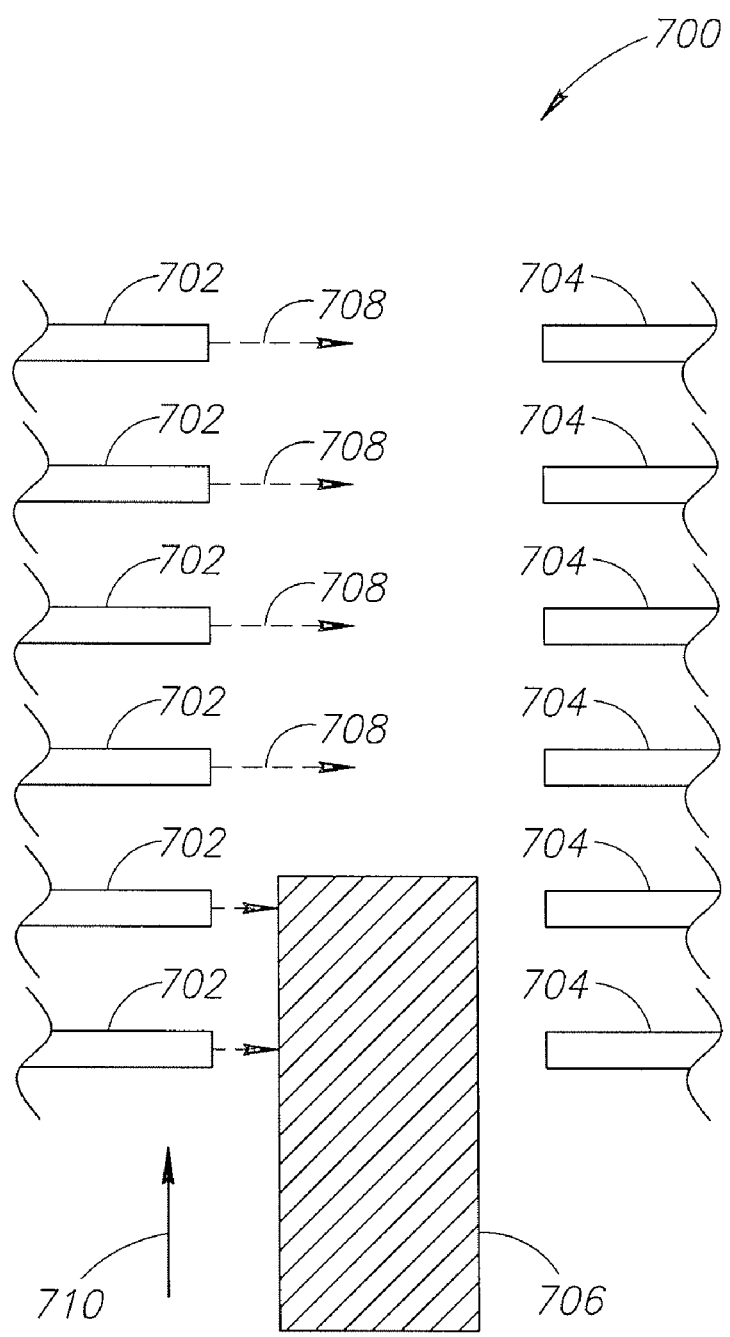
FIG. 7 is a side elevational view of a sensor assembly in accordance with a further embodiment of the invention.

FIG. 7 is a side elevational view of a sensor assembly 700 in accordance with a further embodiment of the invention. In this embodiment, the sensor assembly 700 includes a plurality of transmitting fibers 702, a plurality of receiving fibers 704, and an opaque float 706. In operation, an optical signal 708 transmitted from each of the transmitting fibers 702 is either received by a corresponding receiving fiber 704, or blocked by the opaque float 706. As a fuel level within the fuel tank 102 rises, the opaque float 706 moves in an upward direction 710, blocking an increasing number of the optical signals 708.

The sensor assembly 700 may be suitably coupled to one or more other components to perform other desired functions, including, for example, to monitor or maintain a desired fuel level within the fuel tank 102. More specifically, the sensor assembly 700 may be coupled to one or more converter switches 120 (FIG. 1) which may, in turn, be coupled to the processor 132. Based on the number of optical signals 708 blocked by the opaque float 706, the processor 132 may determine the fuel level within the fuel tank 102, and they send appropriate control signals to raise the level as desired.

As mentioned above, embodiments the present invention may be used in a wide variety of applications, including aircraft, ships, construction vehicles, and a wide variety of other machinery. It will be appreciated that embodiments of the present invention may also be used to monitor the level of fluids other than fuel, including other flammable liquids (e.g. liquid propane, oil, etc.), or nonflammable liquids (e.g. water, juice, milk, etc.). Therefore, although embodiments of the present invention had been described above with respect to the measurement of fuel within a fuel tank, it will be appreciated that embodiments of the present invention may be used in a wide variety of applications that do not involve the measurement of fuel.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A sensor assembly adapted to sense a fluid level, comprising:
   at least one optical fiber having an end portion configured to transmit an optical signal and to receive a reflected optical signal;
   a moveable float member configured to move in a first direction as the fluid level increases and in a second direction as the fluid level decreases, the float member being operatively positioned relative to the end portion of the at least one optical fiber and being further configured to block the optical signal at a first value of the fluid level, and to allow the optical signal to pass at a second value of the fluid level, wherein the moveable float member includes an opaque portion and an optically-transmissive portion, the moveable float member being configured to block the optical signal when the fluid level is at the first value of the fluid level; and
   a reflective member positioned opposite the moveable float member from the end portion of the at least one optical fiber and being configured to receive the optical signal from the end portion and to reflect the reflected optical signal toward the end portion.

2. The sensor assembly of claim 1, wherein the moveable float member includes an opaque portion configured to block the optical signal when the fluid level is approximately at a desired level.

3. The sensor assembly of claim 1, wherein the moveable float member is configured to block the optical signal with the opaque portion when the fluid level is not at a desired level.

4. An assembly, comprising:
   a tank configured to receive a fluid;
   a controller configured to control a flow of fluid into the tank; and
   a sensor assembly operatively coupled to the controller and to the tank and configured to sense a fluid level within the tank, the sensor assembly including:
      at least one optical fiber configured to at least one of transmit and receive an optical signal; and
      a moveable float member configured to move in a first direction as the fluid level increases and in a second direction as the fluid level decreases, the moveable float member being further configured to block the optical signal at a first value of the fluid level, and to allow the optical signal to pass at a second value of the fluid level, wherein the moveable float member includes an opaque portion and an optically-transmissive portion, the moveable float member being configured to block the optical signal with the opaque portion when the fluid level is at the first value of the fluid level, and to allow the optical signal to pass through the optically-transmissive portion when the fluid level is at the second value of the fluid level.

5. The assembly of claim 4, wherein the moveable float member includes an opaque portion configured to block the optical signal when the fluid level is approximately at a desired level.

6. The assembly of claim 4, wherein the at least one optical fiber comprises a first optical fiber adapted to transmit the optical signal, the sensor assembly further comprising a second optical fiber adapted to receive the optical signal from the first optical fiber.

7. The assembly of claim 4, wherein the at least one optical fiber comprises a plurality of first optical fibers adapted to transmit a plurality of first optical signals, the sensor assembly further comprising a plurality of second optical fibers adapted to receive the first optical signals from the plurality of first optical fibers.

8. The assembly of claim 4, wherein the at least one optical fiber is adapted to transmit the optical signal and to receive a reflected optical signal, the sensor assembly further comprising a reflective member adapted to receive the optical signal from the at least one optical fiber and to reflect the reflected optical signal toward the at least one optical fiber.

9. A method of sensing a level of a fluid, comprising:
   transmitting an optical signal;
   providing an opaque member that changes position in accordance with the level of the fluid, including providing a moveable float member having an opaque portion and an optically-transmissive portion, the moveable float member being configured to block the optical signal with the opaque portion when the fluid level is at the first value of the fluid level, and to allow the optical signal to pass through the optically-transmissive portion when the fluid level is at the second value of the fluid level;
   blocking the optical signal with the opaque member at a first level of the fluid;
   allowing the optical signal to pass at a second level of the fluid; and detecting at least one of a presence and an absence of the optical signal, wherein transmitting an optical signal includes transmitting an optical signal from a first optical fiber to a reflective member positioned opposite the opaque member from the first optical fiber, and wherein detecting includes detecting at least one of a presence and an absence of a reflected optical signal from the reflective member.

10. The method of claim 9, wherein blocking the optical signal with the opaque member includes blocking the optical signal with the opaque member when the fluid level is approximately at a desired level.

\* \* \* \* \*